United States Patent [19]

Moreno et al.

[11] Patent Number: 5,081,595

[45] Date of Patent: Jan. 14, 1992

[54] PAPER SUPPLY TRAY STATUS IN ELECTRONIC PRINTERS

[75] Inventors: Josefina Moreno, Rochester; Paul J. Valliere; John L. Rourke, both of Fairport; George W. Webster, Rochester; Glen A. Dumas, Henrietta; Kris D. Kirchner, Ontario; Jack R. Ratcliffe, II, Pittsford; Carol P. Parsons, Rochester, all of N.Y.

[73] Assignee: Xerox Corporation, Stamford, Conn.

[21] Appl. No.: 590,101

[22] Filed: Sep. 28, 1990

[51] Int. Cl.⁵ .............................................. G06K 15/00
[52] U.S. Cl. .................................... 395/111; 355/311
[58] Field of Search ................................ 364/518-520, 364/235 MS, 930 MS; 355/311, 300, 312, 313; 346/154; 400/605, 607.2, 624; 271/9

[56] References Cited

U.S. PATENT DOCUMENTS

| | | | |
|---|---|---|---|
| 4,302,098 | 11/1981 | Kan et al. | 355/55 |
| 4,393,375 | 7/1983 | Sugiura et al. | 340/700 |
| 4,763,889 | 8/1988 | Dei et al. | 355/311 |
| 4,796,056 | 1/1989 | Ito | 355/14 SH |

*Primary Examiner*—Arthur G. Evans
*Attorney, Agent, or Firm*—Frederick E. McMullen

[57] ABSTRACT

A high speed electronic printing system in which the number of paper trays for supplying print media is substantially less than the number of different print media selections that can be programmed for each print job, with a system for identifying missing print media while printing together with an available paper tray into which the print media can be loaded to allow uninterrupted processing of print jobs.

13 Claims, 17 Drawing Sheets

PAPER SUPPLY TRAY STATUS IN ELECTRONIC PRINTERS

The invention relates to electronic printers and printing systems, and more particularly, to a print media identification system to facilitate supplying the correct print media to a printer in a timely fashion so as to minimize printing delays and interruptions.

Future electronic printers and printing systems are intended to provide the operator or user with as many job programming options and selections as reasonably possible. One every significant programming option is choice of stock, i.e. the print media on which the prints are made. The number of print media choices is very large considering the great number of different sheet sizes, colors, and types that are used by people today. And the number is multiplied when the specific needs of different foreign countries are included. However, the capacity of printers to handle the different print media types is typically limited to two or three, corresponding to the number of paper trays built into the printer. To accommodate additional print media types would require additional paper trays which, due to size, complexity, and cost restrictions, cannot be justified.

Due to the limited number of print media types that can be handled on line at once, interruptions in the printing process are necessarily incurred where a job is programmed for more print media types than there are printer paper trays. This means that printing is stopped while the next print media called for by the job is located, the paper tray emptied, and the new print media loaded in. As can be understood, where a job has a great number of different print media selections, the number of interruptions and hence the printer down time can become very large.

In the prior art, U.S. Pat. No. 4,796,556 to Ito discloses a copying machine incorporating selection means for automatically selecting paper of a size suited for the size of the document being copied. U.S. Pat. No. 4,302,098 Kan et al discloses a printing apparatus with means to determine whether or not the image to be recorded conforms in size to the copy sheet while U.S. Pat. No. 4,393,375 to Sugiura et al discloses a copier control system with display showing the operational features available and programming selections made.

In contrast, the present invention provides an electronic printing system with printer for processing print jobs and a limited number of paper trays for supplying print media to the printer, the combination comprising: means for monitoring the status of the paper trays while printing jobs; first means to identify an unused one of the paper trays for reloading with the next print media needed to continue printing; second means to identify the next print media required for printing; and control means responsive to the first and second means to enable printing to continue in response to timely loading of the next print media in the unused paper tray.

The present invention further provides a method of operating an electronic printing system having a printer for processing a print job to make prints in accordance with a job program, the printer having an information display screen and N paper trays for supplying print media for printing the job, the number of different print media types in the job program being greater than N, the steps comprising: loading the N paper trays with the first N print media types programmed for the job; actuating the printer to start printing the job; identifying on the screen the next print media type programmed for the job while printing the job; monitoring the status of the paper trays while printing the job; identifying on the screen the paper tray containing a print media type no longer required for printing the job; reloading the paper tray with the next print media type to enable printing of the job to continue without interruption; and repeating the above for each succeeding print media type programmed for the job.

IN THE DRAWINGS

Figure 1:
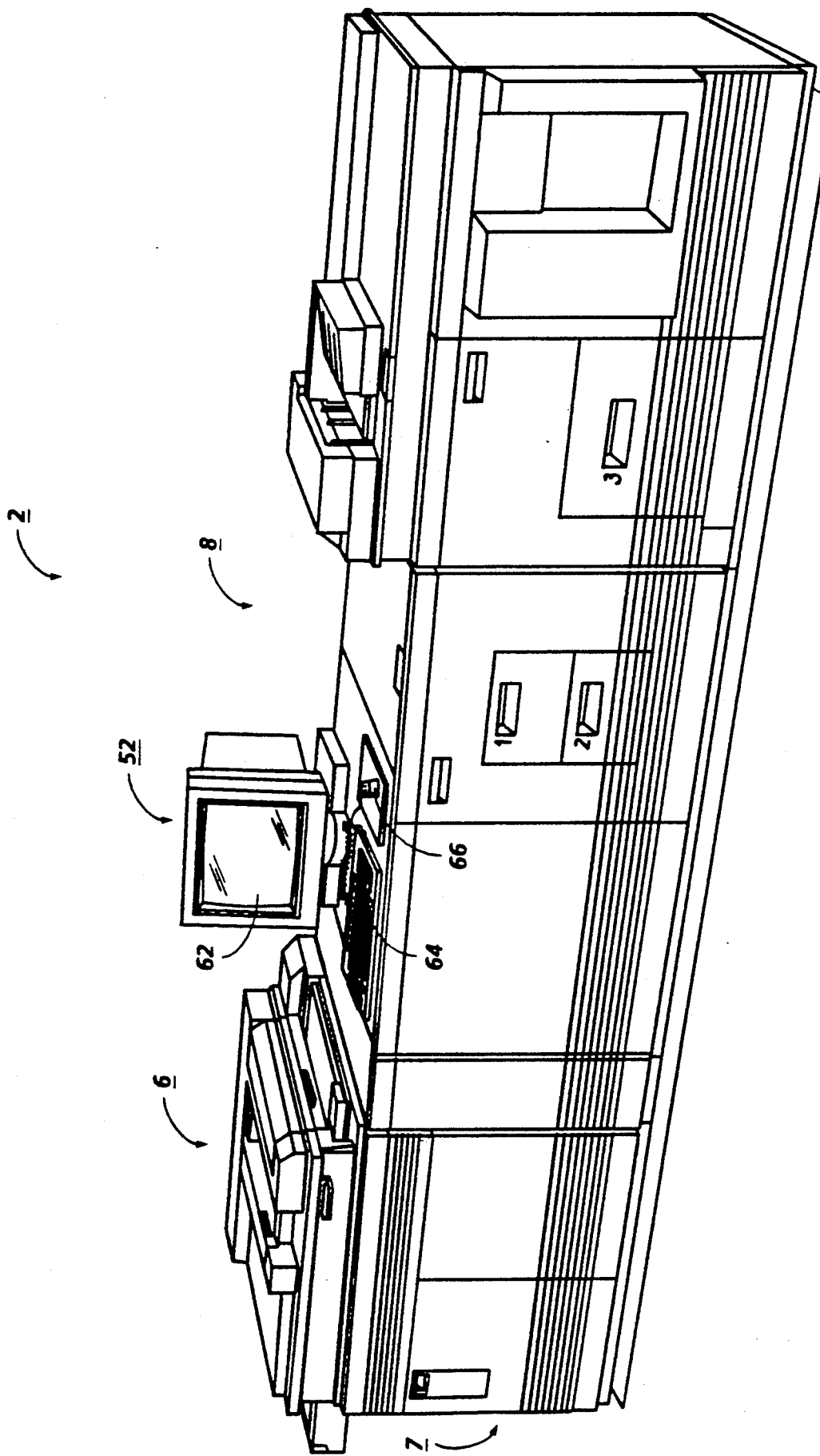
FIG. 1 is a view depicting an electronic printing system incorporating the print media identification system of the present invention.
Figure 5A:
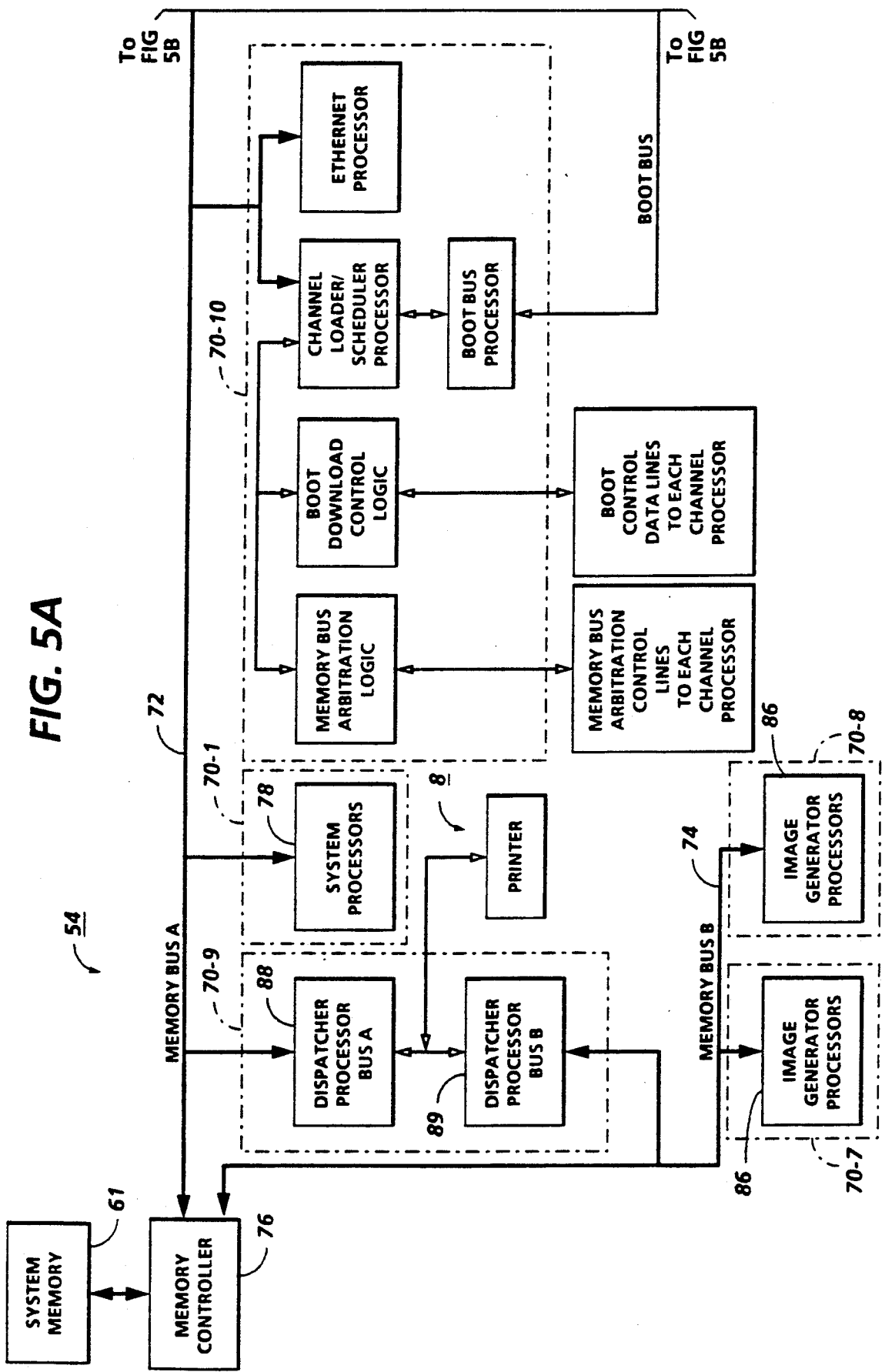
Figure 5B:
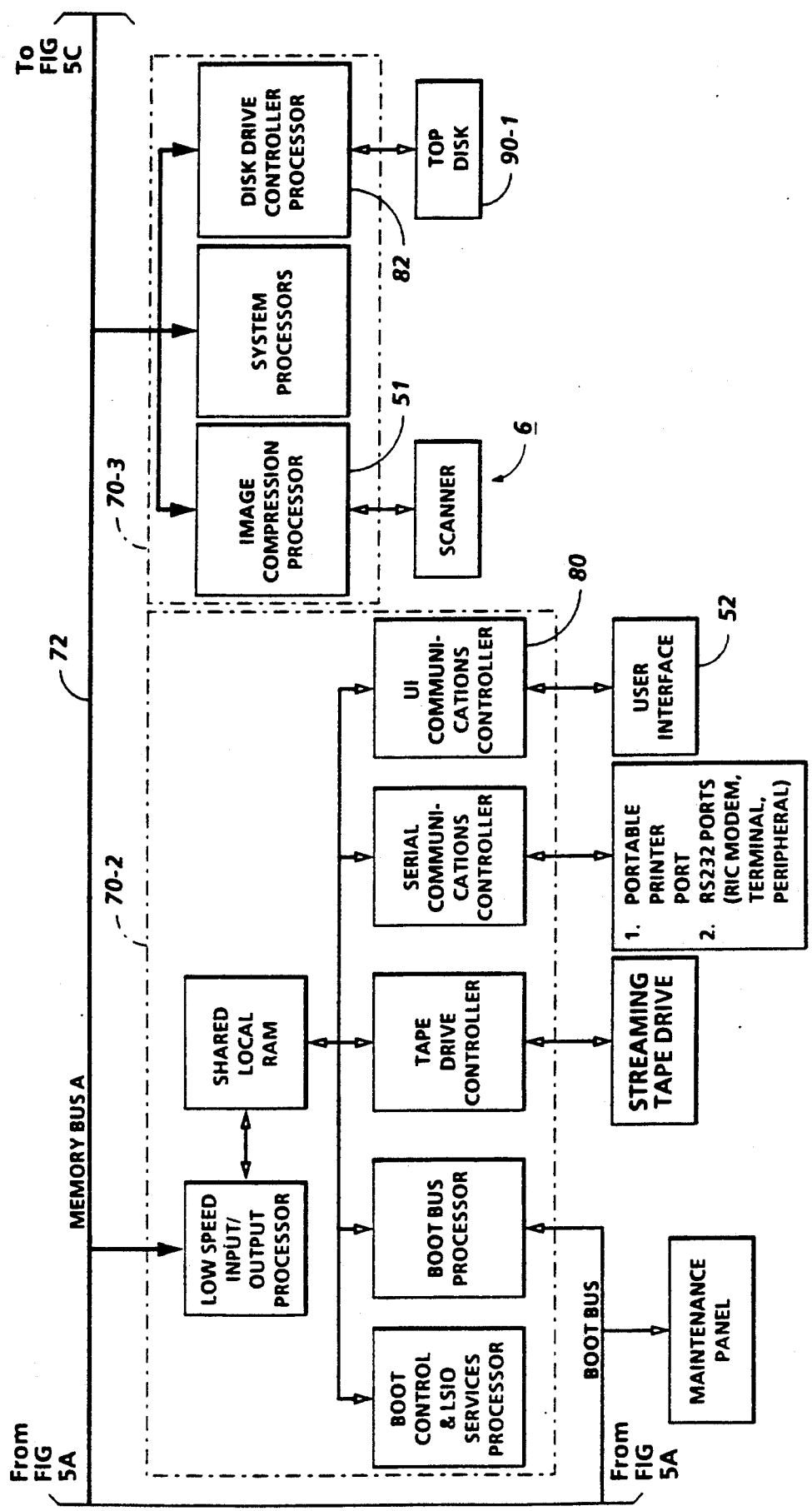
Figure 5C:
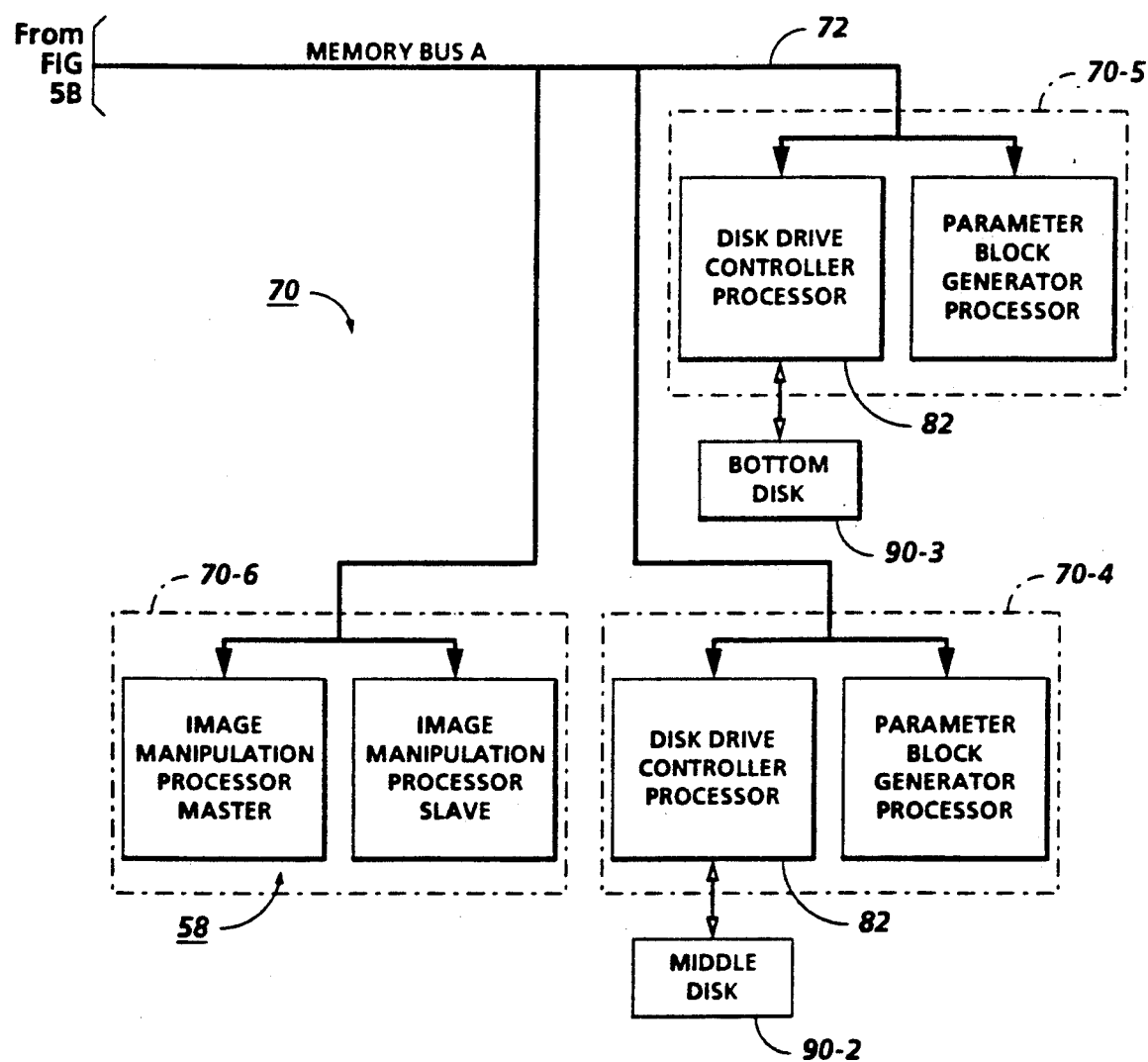
Figure 6:
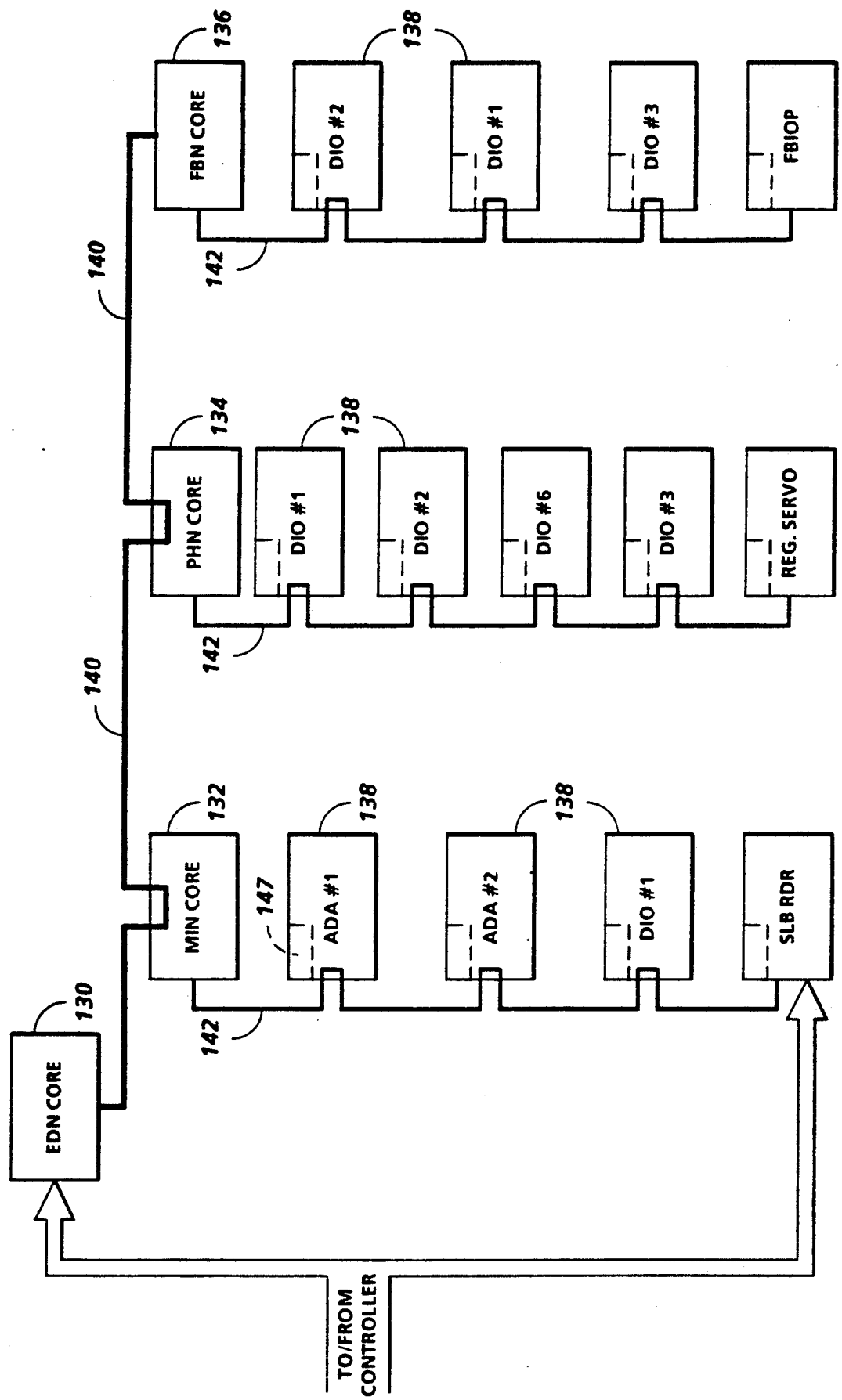
Figure 7:
Figure 8:
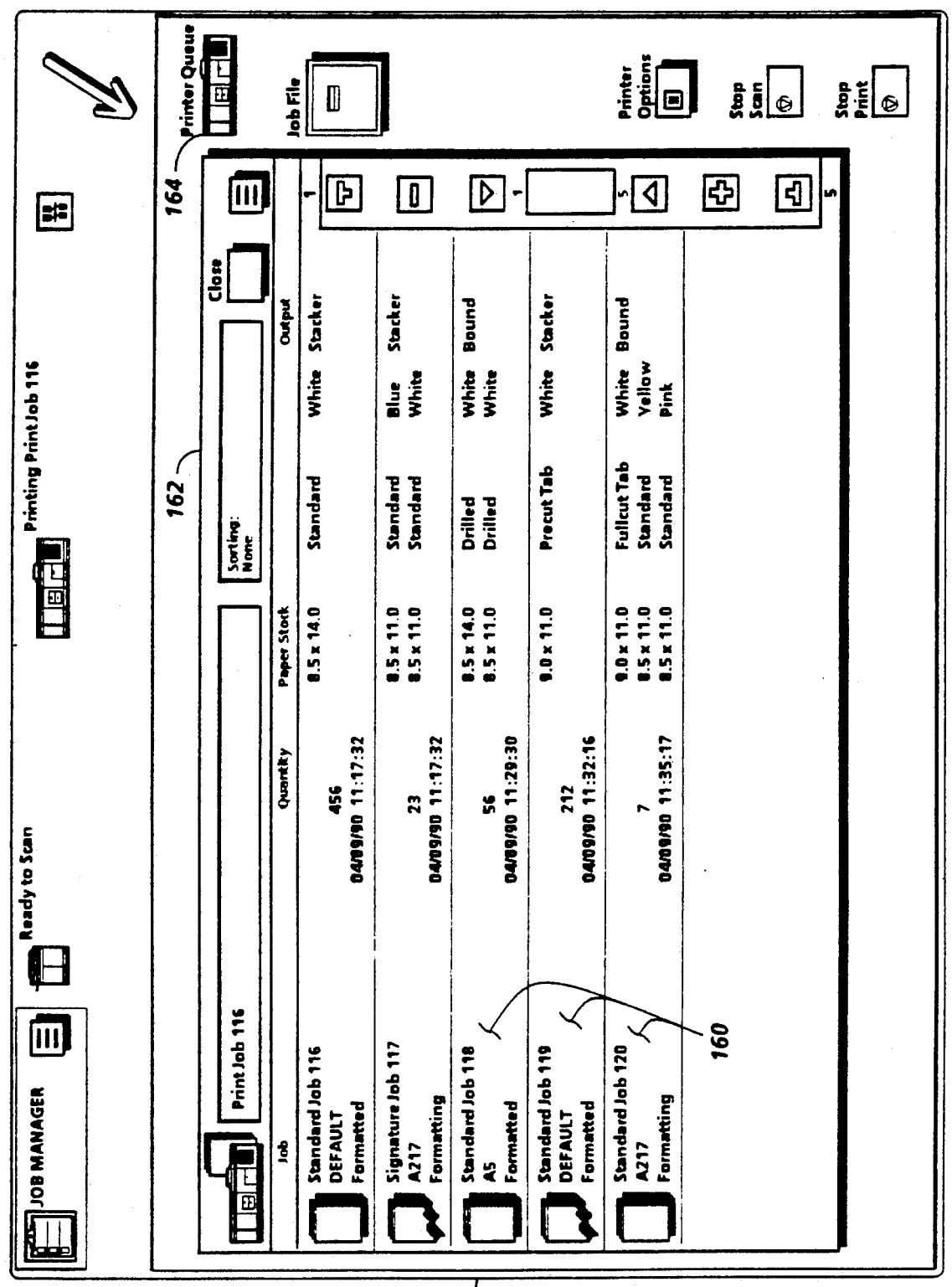
Figure 9:
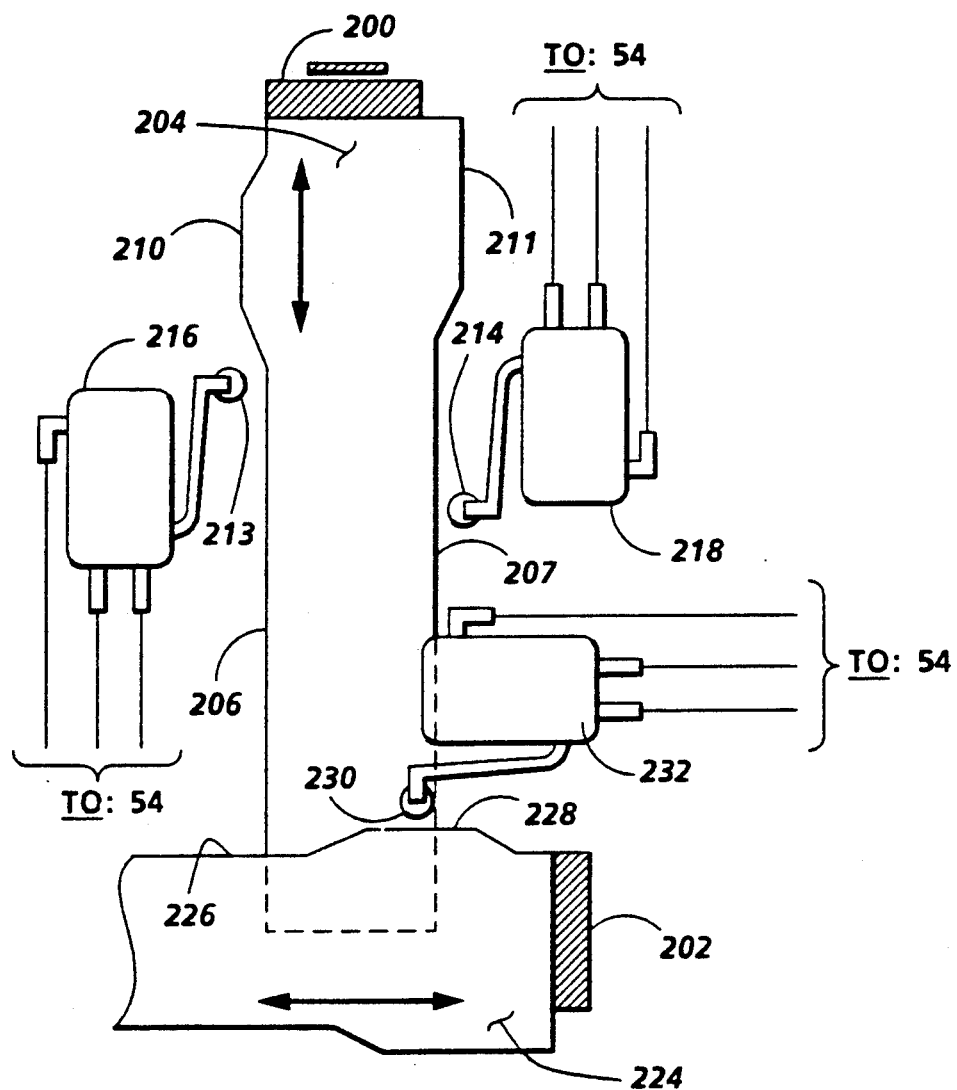
Figure 10:
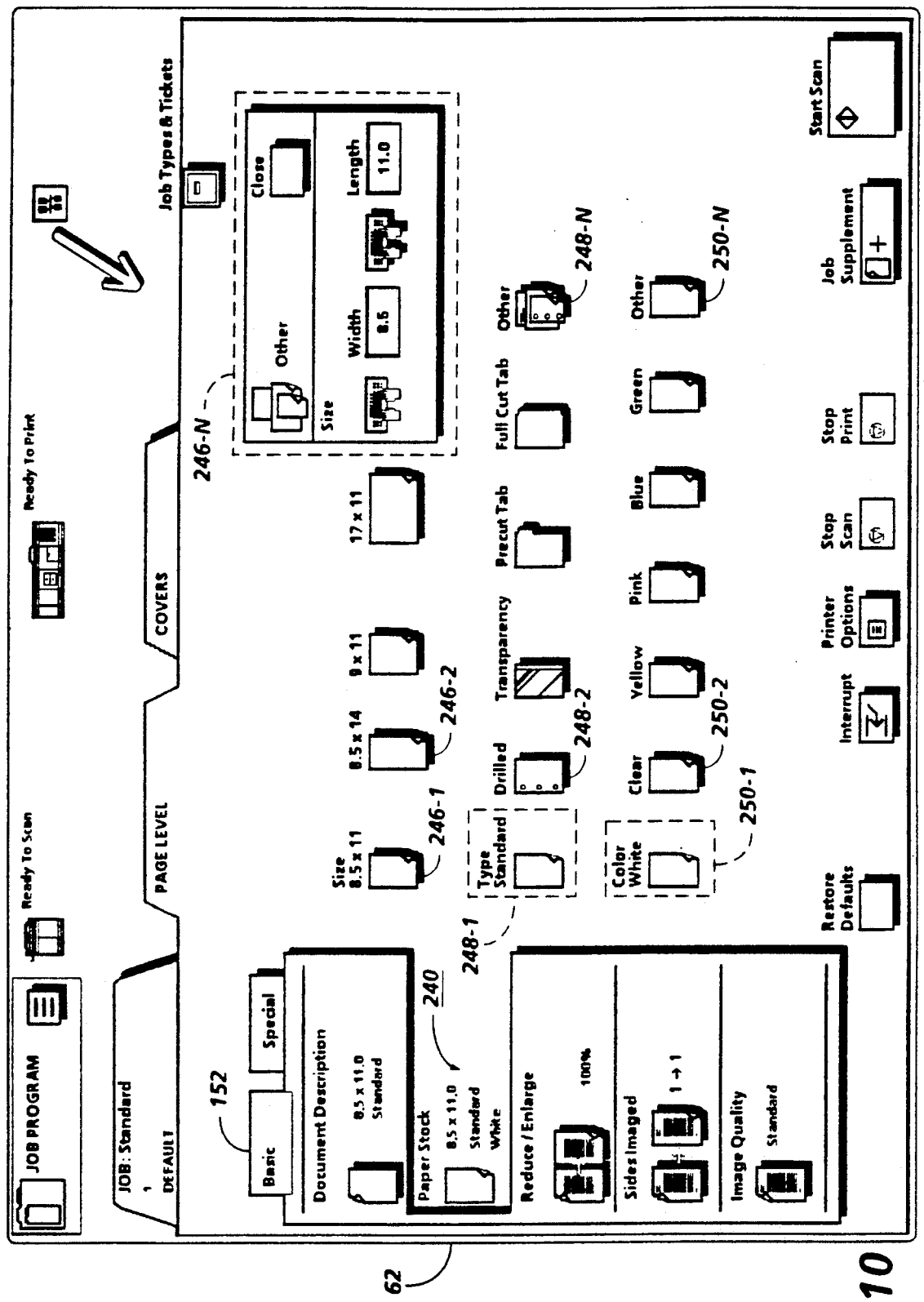
Figure 11:
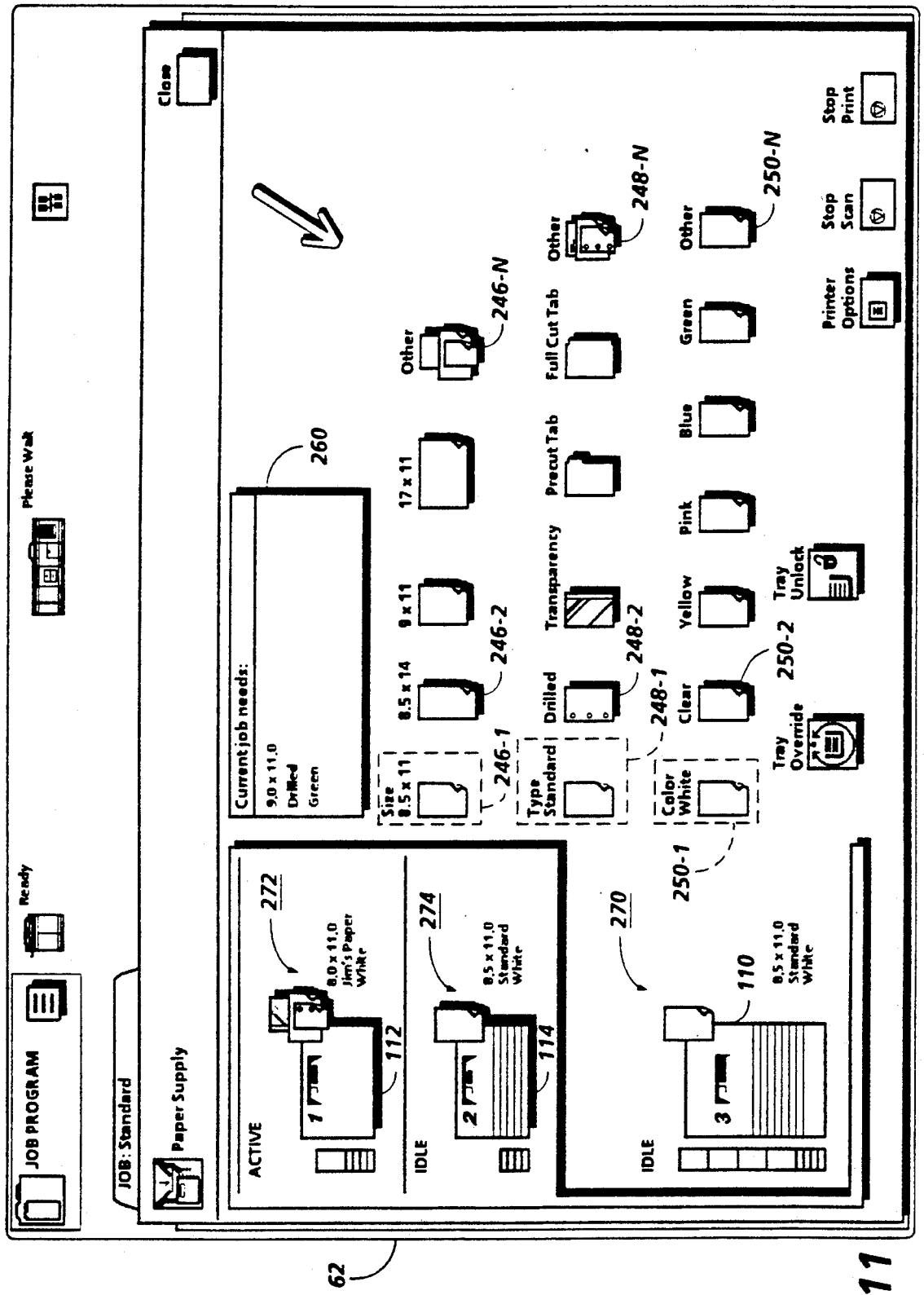
Figure 12:
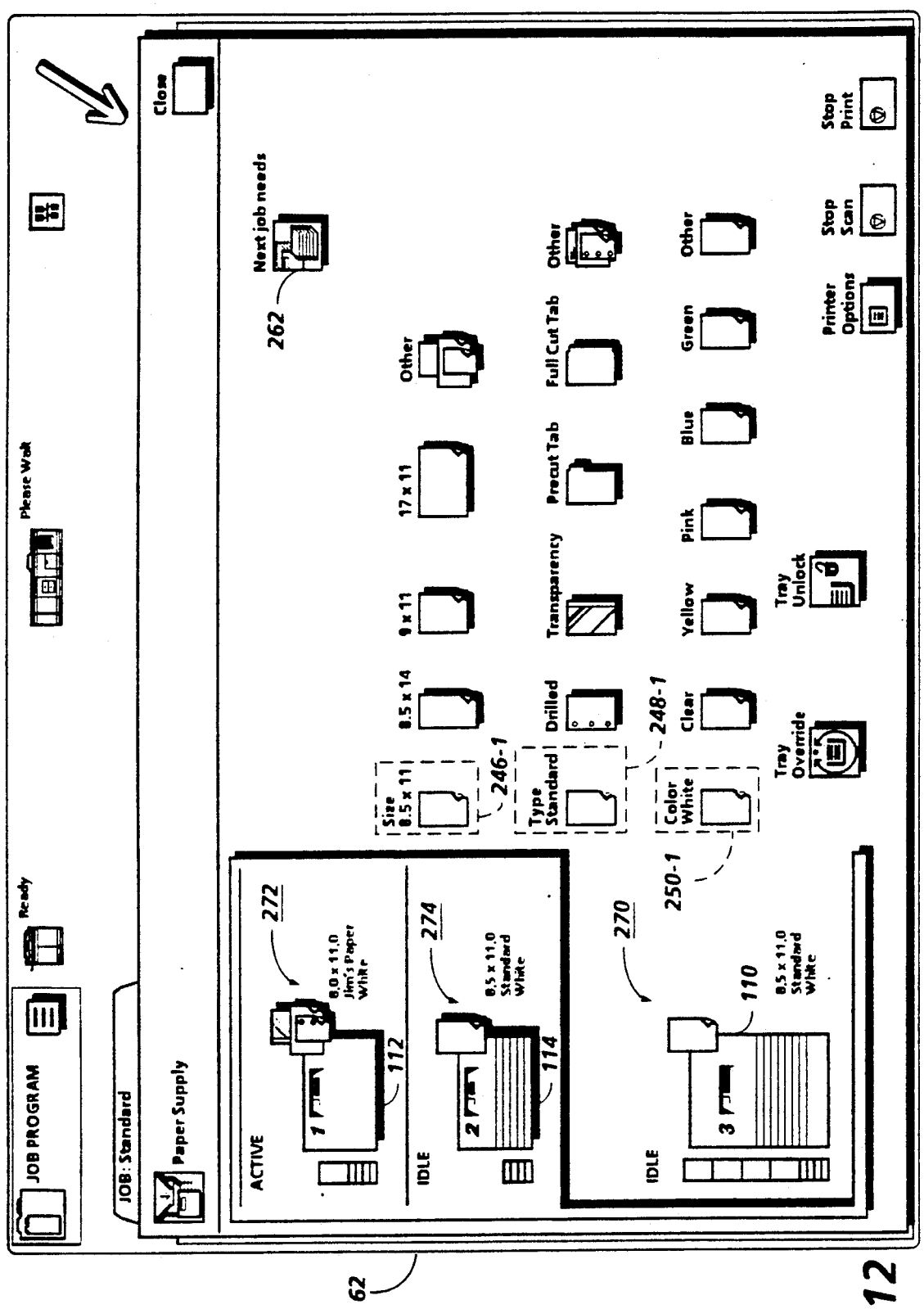
Figure 13:
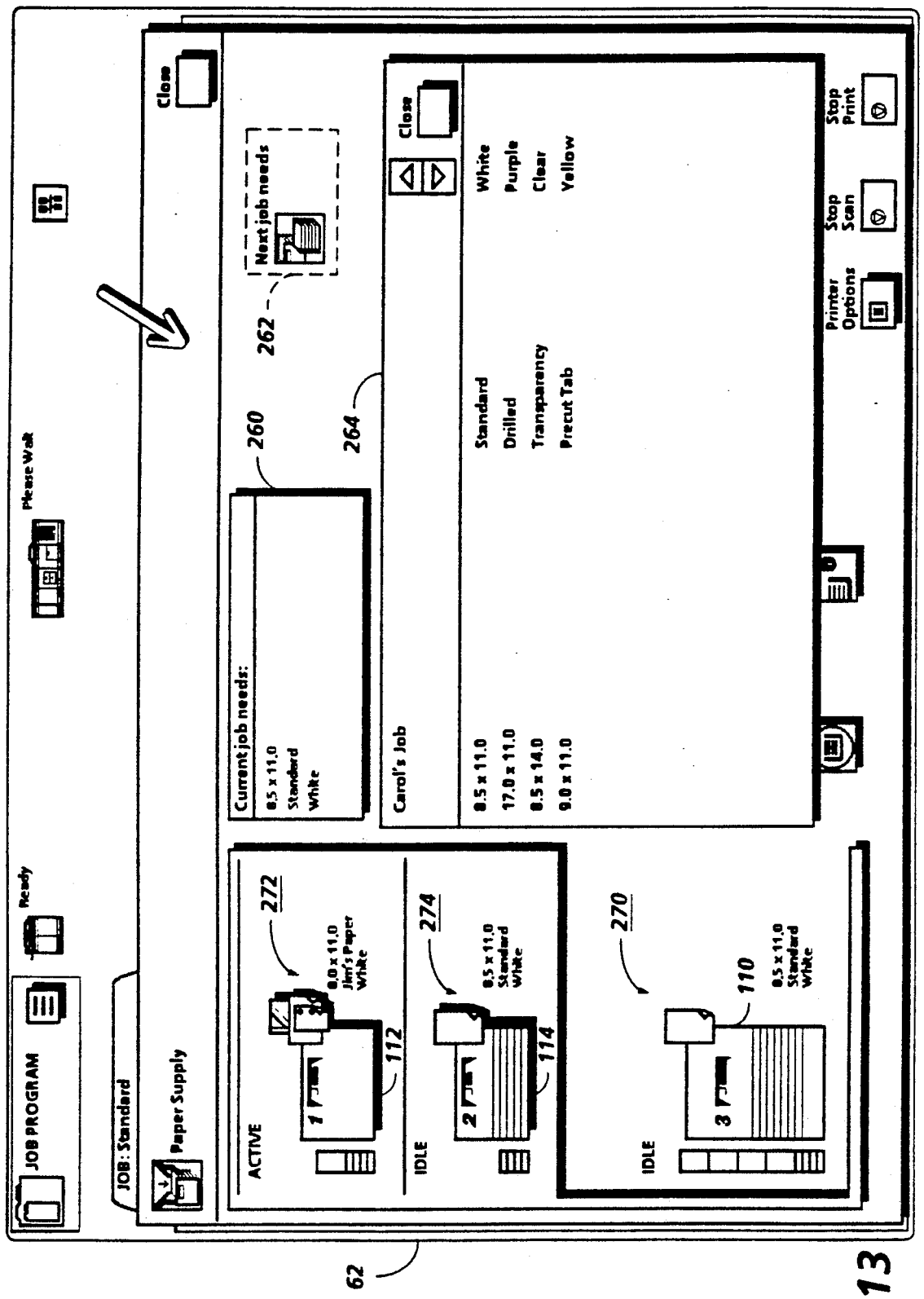
Figure 14A:
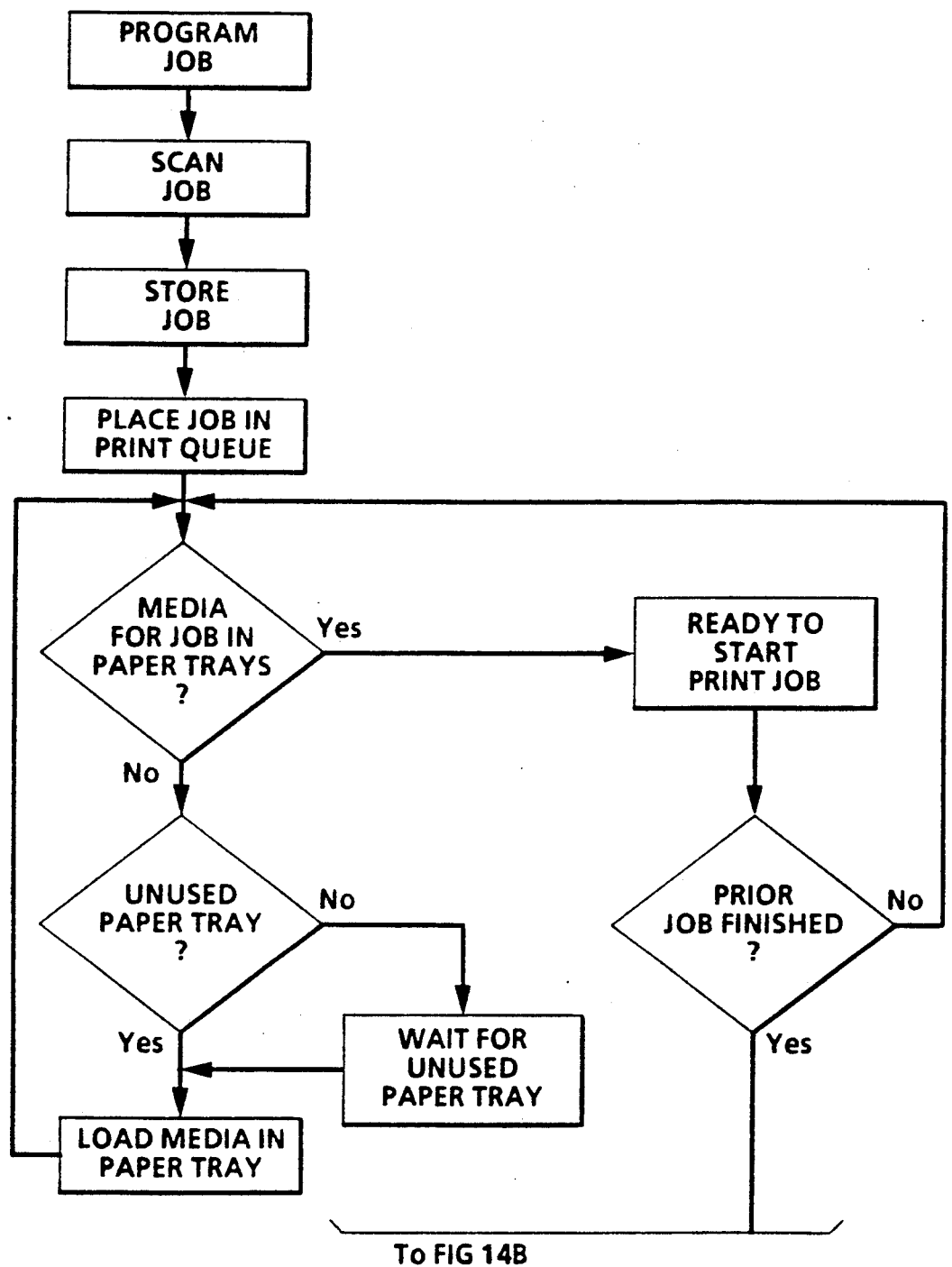
Figure 14B:
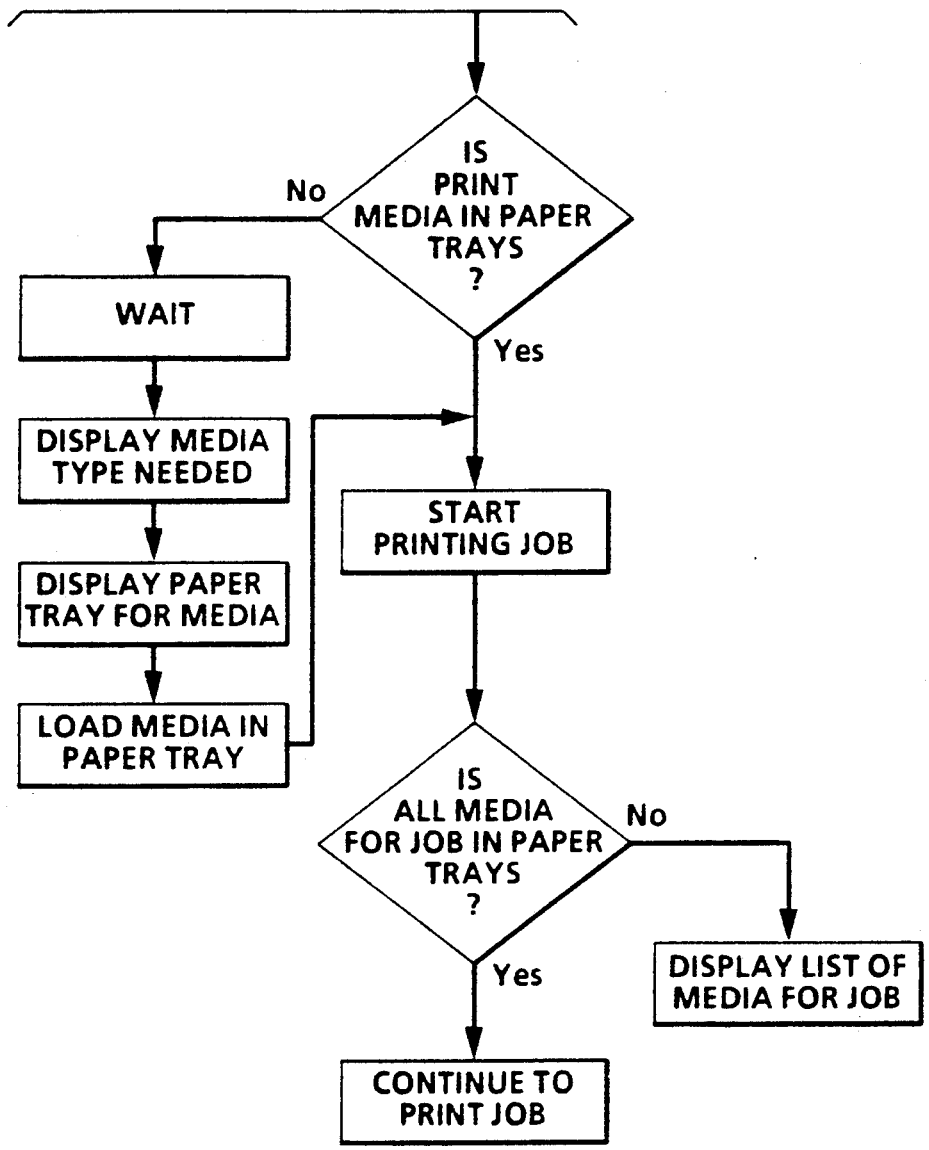

FIGS. 5A 5B and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8 is a view depicting an exemplary print queue of jobs to be printed on the UI touchscreen;

FIG. 9 is a view illustrating the principal mechanical components of the sheet size detecting apparatus associated with the system paper trays;

FIG. 10 is a view depicting an example of a job scorecard with the Paper Stock selection opened to display various Paper Stock programming selections on the UI touchscreen;

FIG. 11 is a view showing an example of the "Current Job Needs" window displayed on the UI touchscreen identifying the print media next needed to continue printing together with a paper tray icon identifying the paper tray available for reloading with the next print media;

FIG. 12 is a view depicting the "Next Job Needs" icon displayed on the UI touchscreen;

FIG. 13 is a view depicting an example of the "Next Job Needs" window that is displayed upon actuation of the "Next Job Needs" icon to provide a list of the print media programmed for the next print job on the UI touchscreen; and FIGS. 14A and 14B are a flow chart depicting the print media identification system of the present invention.

Figure 2:
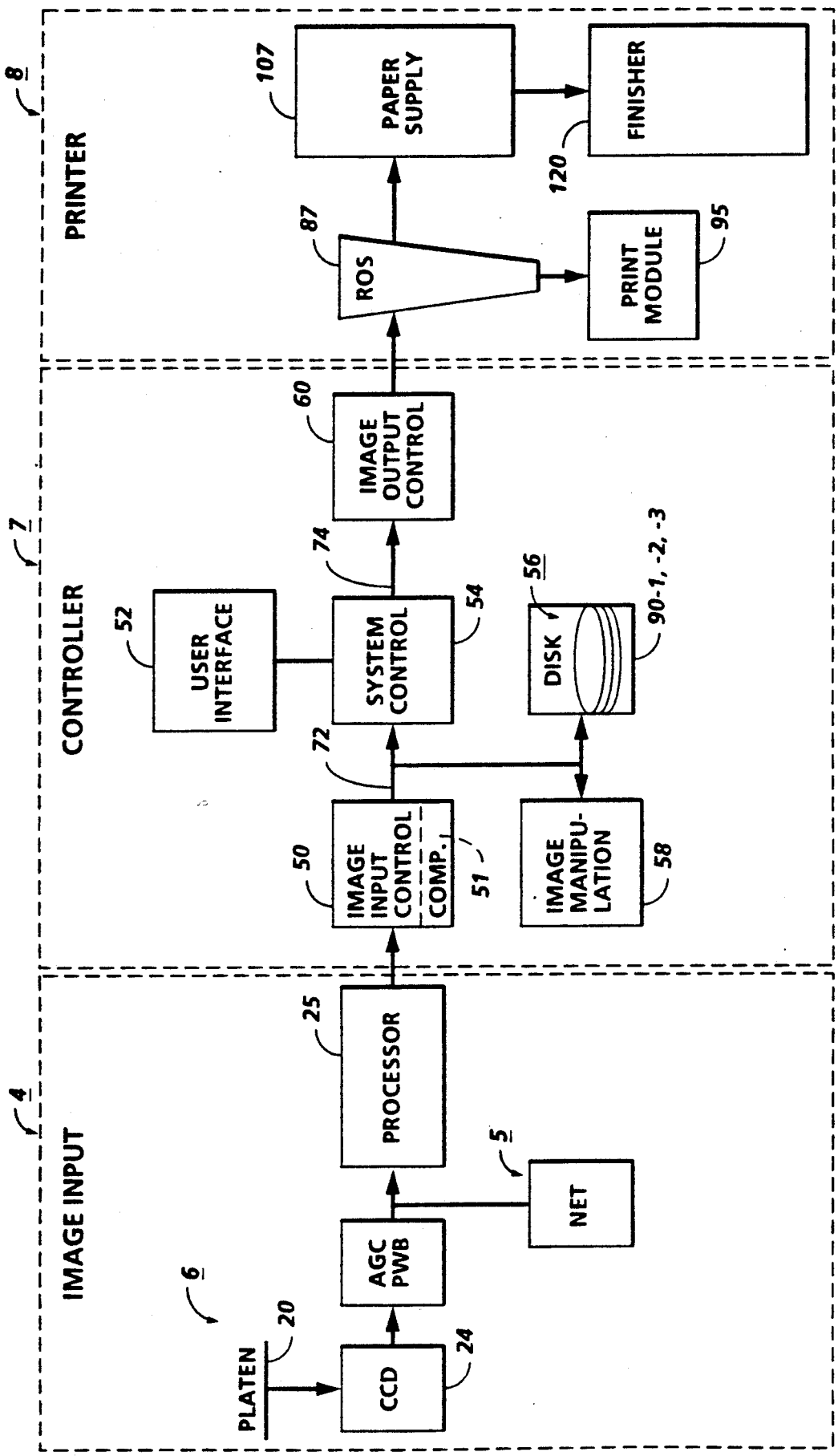
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and onsite image inputs, enabling system 2 to provide network, scan, and print services. Other system combinations may be envisioned such as a stand alone printing system with on-site image input, controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
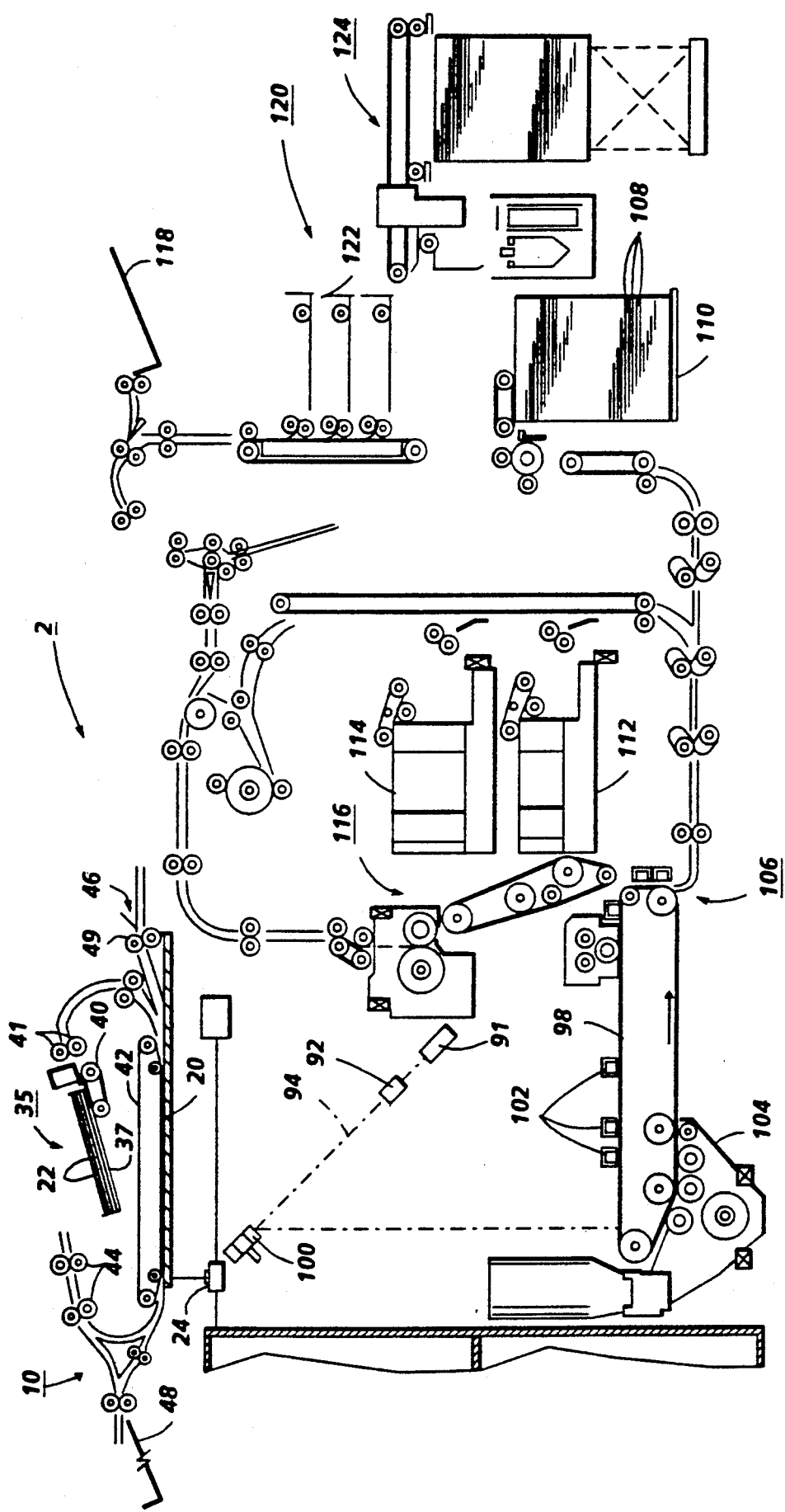
FIG. 3 is a plan view illustrating the principal mechanical components of the printing system shown in FIG. 1.
Figure 4:
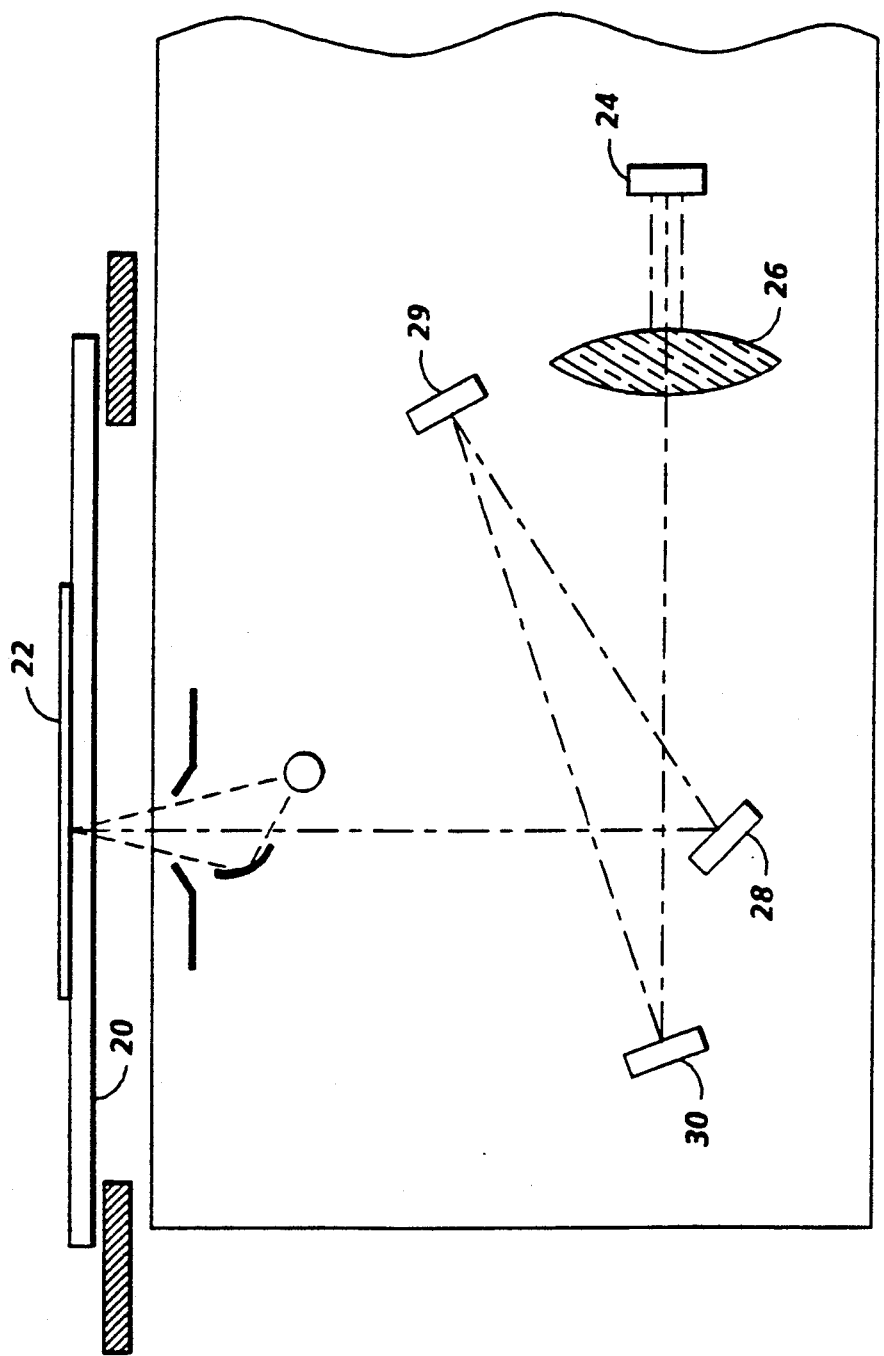
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIG. 9, paper trays 110, 112, 114 each include adjustable sheet length and width guides 200, 202. Guides 200, 202 are adjusted by the operator when loading the print media 108 into the paper trays in accommodation of the length and width of the media being loaded. Length guide 200 has a plate-like extension 204 at the base thereof extending at right angles to guide 200, extension 204 moving with length guide 200 as guide 200 is adjusted to the size of the media loaded into the tray. The opposing sides 206, 207 of extension 204 are provided with cam-like surfaces 210, 211 onto which rollers 213, 214 of length sensing switches or sensors 216, 218 ride. The open and closed positions of switches 216, 218 each provide two length size measurements of the media loaded into trays 110, 112, 114.

Similarly width guide 202 has a plate-like extension 224 at the base thereof extending at right angles to guide 202, extension 224 moving with width guide 202 as guide 202 is adjusted to the size of the media loaded into the tray. One side 226 of extension 224 is provided with a cam-like surface 228 onto which roller 230 of width sensing switch or sensor 232 rides. The open and closed position of switch 232 provides two width size measurements of the media loaded into trays 110, 112, 114.

The signals output by sensors 216, 218 and 232 are input to system controller 54 (FIG. 2) to enable controller 54 to monitor the size of the media in paper trays 110, 112, 114 as will appear.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52, PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Items such as files and icons displayed on touchscreen 62 are described herein as being highlighted, actuated, opened, or selected by either touching the displayed item or pointing curser 67 at the item and keying mouse 66.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. Various Job Ticket types are provided, with access by means of Job Types and Ticket icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

Referring also to FIG. 8, when a job 160 is printed, the job is moved from main memory 56 into a print queue 162. A PRINTER QUEUE icon 164 on touchscreen 62, when actuated, displays the current print queue with a list of the jobs in the queue on touchscreen 62. Each job 160 in print queue 162 has a job descriptor identifying the job by name and job number; print quantity; the media (Paper Stock) size, type, and color; and type of finishing (Output). Print queue 162 is ordered by priority and time of arrival of the job in the print queue.

As described, print jobs are derived from multiple sources, i.e., jobs scanned in by scanner 6; jobs scanned in, stored, and then edited or added to for printing later; jobs remotely scanned in and submitted to the system as for example through net 5; jobs remotely developed and then submitted to the system for printing; etc. As will appear, in all cases, the system, in order to print the job programmed, must know what the print media loaded in the paper trays is at any given time and correlate the job program requirements with the print media in the trays to assure that the correct print media is loaded in at least one tray ready for printing. If the correct print media is present, the job proceeds to print; if not, the operator is given a reminder to load the print media required.

Referring to FIGS. 7 and 10, one of the selections to be made when programming a job is to choose the media type (Paper Stock) on which prints will be made. During the job programming mode, a PAPER STOCK icon 240 is displayed on a job Scorecard 152 on touchscreen 62. Actuating icon 240 displays three levels of media selections, namely size, type, and color on touchscreen 62 adjacent Scorecard 152. At the size selection level, a series of icons 246-1, 246-2, . . . 246-n are displayed, each depicting the various sheet size selections available. The selections include an "other" icon 246-n for custom selections. At the media type selection level, a series of icons 248-1, 248-2, . . . 248-n are displayed, depicting the various types of media that are available for selection including an "other" icon 248-n for custom selections. And at the color selection level, a series of icons 250-1, 250-2, . . . 250-n are displayed, depicting the various media color selections including an "other" icon 250-n for custom selections. The job program including the media chosen for the job is entered into main memory 56 where it is held pending use.

In the exemplary job #116, the job ticket 150 therefor shown in FIG. 7 has the Paper Stock for the job programmed for 8.5"×11" (size), standard (type), and white (color) media. In FIG. 8, job #116 is shown in Print queue 162 as the next job to be printed.

Since the number of paper trays is limited, selection of more media types than there are trays 110, 112, 114 for a job requires that one or more of the trays be reloaded while the job is being printed. Where the media programmed for the job is not in one of the paper trays 110, 112, 114 when needed, printing of the job is interrupted and printer section 8 enters a wait state until the required media is in place.

In addition to possible intra job delays occasioned by the need to stop and load a different print media, inter job delays are also possible. These can occur when the next print job in the print queue 162 is programmed for a different media than the media programmed for the job currently being printed. Where the media programmed for the next job is not loaded into at least one of the trays 110, 112, 114, start of printing of the next job is precluded until the correct media type is in place.

Referring to FIGS. 7, 10, 11 and 14, paper trays 110, 112, 114 have a predetermined Paper Stock default setting (shown here as 8.5"×11.0"—Standard-White) together with a priority of use setting. Tray priority may for example comprise auxiliary tray 112 first, auxiliary tray 114 second, and main tray 110 third. Where the job to be printed in print queue 162 is programmed for the same media as specified by the default setting (i.e., 8.5"×11.0"—Standard-White), system controller 54 will first check paper tray 112 to determine if there is media present in the tray, and if the media in the tray is 8.5"×11.0"—Standard-White. Presuming that tray 112 is not empty (or disabled for some reason) and that the correct media is in the tray, printing of the job will start using tray 112 as the media source when printing of the preceding job in the print queue is completed.

If tray 112 is empty, unavailable, or programmed for a media other than that programmed for the job (i.e., 8.5"×11.0"—Standard-White), system controller 54 next checks auxiliary tray 114. If tray 114 has media therein and the media in tray 114 is the correct media (i.e., 8.5"×11.0"— Standard-White), printing of the job starts using tray 114 as the media source. If auxiliary tray 114 is empty, unavailable, or is programmed for a different media, main tray 110 is checked in the manner described. If tray 110 has the correct media, printing of the job commences using tray 110 as the source of media.

Where the media programmed for the job is not in any of the paper trays 110, 112, 114, printing section 8 enters a wait state until the correct media is loaded in one of the paper trays.

Referring particularly to FIG. 11, where the current job program calls for one or more additional media types (i.e., 9.0"×11.0"—Drilled-Green), and an idle or unused paper tray is available for loading the media, a "Current Job Needs" window 260 is displayed on touchscreen 62. Window 260 displays information identifying the size, type, and color (i.e., 9.0"×11.0"— Drilled-Green) of the media required. Icons 270, 272, 274 representing paper trays 110, 112, 114 respectively are also displayed, each with a message showing the current state (i.e., "active" or "idle") of each tray. The icon 270, 272, or 274 representing the paper tray that is available for reloading is highlighted to identify the paper tray to the operator. In the example shown, icon 270 representing main paper tray 110 is highlighted to identify tray 110 for reloading.

While loading the media, the operator identifies the specific media being loaded into the tray by actuating appropriate one of the type and color icons 248, 250 displayed on touchscreen 62. Media size, i.e., length and width are automatically detected by sensors 216, 218, 232 (in FIG. 9) at the paper trays and thus specific programming of media size by the operator is not required. The programming input accompanying the loading of media into the paper trays enables the system to identify the media loaded into each paper tray and to use that information to compare with the media programmed for the job to assure that the correct media is in place. Where the media loaded is not that called for by the job program, printer section enters a wait state when the media needed for the job is not detected.

Similarly, where the job is programmed for a third media and an unused or idle paper tray is available, window 260 will display the required media and the paper tray icon 270, 272, or 274 for the paper tray available for reloading will be highlighted as described.

Referring particularly to FIGS. 12 and 13, where the media required for the job currently being printed is loaded and there remains one or more idle or unused paper trays, a "Next Job Needs" icon 262 is displayed on touchscreen 62. Actuating icon 262 displays a Next Job Window 264 in which the media required for the next job is displayed. Where one of the paper trays 110, 112, or 114 is available for loading, the paper tray icon 270, 272, 274 for that tray is also highlighted to identify the available tray to the operator. The unused paper tray is accessed and the media for the next job loaded into the tray, readying printer section 8 for the next job. All additional media types programmed for the next job are displayed in the form of a listing in window 264. This permits the operator to identify and load other media for the job in any currently available and unused paper trays. Further, by identifying the media types needed for the job, the operator is able to assemble the different media types for use when printing the job.

While the invention has been described with reference to the structure disclosed, it is not confined to the details set forth, but is intended to cover such modifications or changes as may come within the scope of the following claims.

We claim:

1. In an electronic printing system including a printer for processing print jobs to provide prints on a print media in response to job program instructions, said job program instructions including selection of one or more print media types for individual ones of said jobs, and plural paper trays for supplying said print media to said printer, the combination of:
   a) means for loading the print media for the next one of said jobs to be printed in said paper trays;
   b) media identification means for identifying the print media types loaded in each of said paper trays;
   c) means for monitoring the print media types required by said job programming instructions for printing said one job while said one job is being printed; and
   d) control means for operating said system including
      1) first means responsive to said media identifying means and said monitoring means to identify the next print media type required to print said one job that is not loaded into at least one of said trays;
      2) second means responsive to said media identifying means and said monitoring means to identify paper trays having a print media type not currently required for printing said one job, and
      3) third means responsive to loading of said next print media in said one paper tray to enable printing of said one job to continue.

2. In an electronic printing system having a printer for processing a print job to make prints in accordance with a job program, said printer having an information display screen and plural paper trays for supplying print media for printing said job with the number of different print media types in said job program being greater than said plural paper trays, the steps comprising:
   a) means to monitor the status of said paper trays while printing said job;
   b) first means to display on said screen the next print media type programmed for said job while printing said job;
   c) second means to display on said screen the first of said paper trays containing a print media type not currently required for printing said job for reloading with said next print media type whereby to enable printing of said job to continue without stopping to reload said next print media type; and
   d) control means responsive to loading of said next print media type in said first paper tray to enable processing of said print job to continue whereby to avoid interrupting said printing process in response to a failure to supply said next print media type.

3. In an electronic printing system having a printer for processing a print job to make prints in accordance with a job program, said printer having an information display screen and plural paper trays for supplying print media for printing said job with the number of different print media types in said job program being greater than said plural paper trays, the steps comprising:
   a) loading said paper trays with the print media types first programmed for said job;
   b) actuating said printer to start printing said job;
   c) identifying on said screen the next print media type programmed for said job while printing said job;
   d) monitoring the status of said paper trays while printing said job;
   e) identifying on said screen one of said paper trays in which the print media type loaded in said one paper tray is no longer required for printing said job;
   f) reloading said one paper tray with said next print media type to enable printing of said job to continue without interruption;
   g) repeating steps c-f for each succeeding print media type programmed for said job.

4. A process for operating an electronic printer for printing jobs in accordance with discrete job printing programs having a display screen together with plural paper trays for supplying print media for making prints, comprising the steps of:
   a) programming a print job including selecting at least one print media type for said job;
   b) scanning the documents that comprise said job to provide electronic pages representative of said job for use in making prints;
   c) storing said electronic pages in memory pending use by said printer;
   d) placing said job in an ordered print queue with other jobs to be printed with said jobs arranged in a predetermined printing order;
   e) comparing said one print media type programmed for said job with the print media type in said paper trays;
   f) where said one print media type programmed for said job is not in at least one of said paper trays,
      1) identifying said one print media type required for said job on said screen; and
      2) identifying one of said paper trays for loading with said one print media type on said screen whereby to enable said printer to print said job on loading of said print media type in said one paper tray.

5. The process according to claim 4 including the steps of:
   where the number of print media types programmed for said job is greater than said paper trays, enabling printing of said job to start in response to loading of the first print media types programmed for said job in said paper trays; and
   while printing said job,
   identifying the next print media type programmed for said job that is not loaded in one of said paper trays on said screen;
   monitoring printing of said job and identifying on said screen the first one of said paper trays in which a print media type therein not currently required for printing said job is loaded; and
   enabling printing of said job to continue in response to loading of said next print media type for said job in said first one of said paper trays.

6. The process according to claim 4 including the step of:
   where all of said paper trays are loaded with the print media types required for printing said job,
   while printing said job,
   identifying the first print media type required for the next job on said screen; and
   identifying on said screen the first one of said paper trays in which a print media type is loaded that is no longer needed for printing said job whereby to enable said first paper tray to be reloaded with the first print media type required for said next job so that printing of said next job is enabled directly after printing of said job is completed.

7. A process for operating an electronic printer having plural paper trays for supplying different print media on which prints produced by said printer are printed, said printer including a display screen, programming means for programming print jobs, scanning means for scanning documents comprising said print jobs and converting said documents to electronic pages, and memory means for storing said electronic pages, the steps comprising;
   a) printing a first of said jobs;
   b) comparing the print media type programmed for the next one of said jobs with the print media types in said paper trays;
   c) where the print media type programmed for said next job is not in at least one of said paper trays,
      1) identifying said print media type programmed for said next job on said screen;
      2) while printing said first job, monitoring said paper trays and identifying any unused one of said paper trays having a print media type no longer required for printing said first job; and
      3) reloading said unused paper tray with the print media type programmed for said next job to enable printing of said next job on completion of printing of said first job.

8. The process according to claim 7 including the step of:
   inhibiting printing of said next job until the print media type for said next job is loaded into at least one of said trays.

9. A process for operating an electronic printer for printing jobs in accordance with discrete job printing programs having a display screen together with plural paper trays for supplying print media for making prints, comprising the steps of:
   a) comparing the print media programmed for said job with the print media in said paper trays;
   b) where the print media programmed for said job is not in at least one of said paper trays,
      1) identifying the print media programmed for said job on said screen;
      2) identifying the first one of said paper trays available for reloading with said print media programmed for said job; and
      3) loading said print media programmed for said job in said first paper tray whereby to enable printing of said job; and
   c) repeating steps a and b for each successive and different ones of the print media programmed for said job.

10. A process for operating an electronic printer for printing jobs in accordance with discrete job printing programs having a display screen together with plural paper trays for supplying print media for making prints, comprising the steps of:
   a) monitoring the status of said paper trays while printing each of said jobs
   b) while printing a job, displaying on said screen the next print media types required to continue printing said jobs without interruption; and
   c) identifying on said screen individual ones of said paper trays when the print media type in said paper trays is not currently needed for the job currently being printed so that said paper trays can be reloaded with said next print media types.

11. A method for processing print jobs in an electronic printing system to make prints, said system having plural paper trays for supplying print media while processing said print jobs, the steps comprising;
   a) inputting a job program for printing a print job by said system, said job program including plural different print media types, the number of said print media types programmed for said job being greater than the number of said paper trays;
   b) loading said paper trays with the print media types programmed for said job in the order in which said print media types are required for printing said job;
   c) while printing said job,
      1) visually identifying the next print media type required for printing said job;
      2) visually identifying the first paper tray having a print media type not currently needed for printing said job;
      3) reloading said first paper tray with said next print media type to allow printing to continue without interruption; and
   d) repeating step c for each succeeding different print media type programmed.

12. The process according to claim 11 including the steps of:
   a) while printing said job, identifying the first print media type programmed for the next job when all of the print media types for the job being printed are loaded in said paper trays;
   b) where a print media type is no longer required for the job being printed, identifying the paper tray containing said print media type; and
   c) reloading said paper tray with the first print media type programmed for said next job whereby to enable said first print media type for said next job to be loaded into said paper tray and printing of said next job to commence on completion of printing of the job currently being printed.

13. A process for operating an electronic printing system for producing a print job, said system having programming means for inputting printing instructions for said job including selection of print media types, printer means for making prints from image signals on said print media types in response to said instructions, and plural paper supply trays for supplying said print media types on which said prints are made by said printer means, comprising the steps of:
   a) loading said trays with the first print media types required to start printing said job;
   b) while printing said job, identifying the next print media type required to continue printing said job;
   c) identifying the tray holding one of said print media types not currently required for printing said job;
   d) unloading said one print media type identified in step c from said tray whereby to provide an empty tray;
   e) loading said next print media type in said empty tray to enable printing of said job to continue;
   f) where said one print media type unloaded from said tray in step d is next required for printing said job, enabling said one print media type to be reloaded into any of said trays including a tray different than said one tray by
   g) repeating steps c and d; and
   h) reloading said one print media type in the empty tray identified in step c.

* * * * *